(12) United States Patent
Chervenka et al.

(10) Patent No.: US 7,877,181 B2
(45) Date of Patent: Jan. 25, 2011

(54) SCALABLE GRAIN TANK FILL LEVEL DISPLAY

(75) Inventors: Kirk Jacob Chervenka, Waukee, IA (US); Barton Jay Stevens, Bettendorf, IA (US); Joshua Dale Wood, Reynolds, IL (US); Tyler David Schleicher, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/463,747

(22) Filed: May 11, 2009

(65) Prior Publication Data

US 2010/0285855 A1 Nov. 11, 2010

(51) Int. Cl.
*G06F 7/70* (2006.01)
*G06F 19/00* (2006.01)
*G06G 7/00* (2006.01)
*G06G 7/76* (2006.01)

(52) U.S. Cl. ........................................ 701/50; 460/119
(58) Field of Classification Search .................... 701/50, 701/212, 207; 56/1; 460/119, 6, 114; 702/5, 702/166; 340/988
See application file for complete search history.

(56) References Cited

U.S. PATENT DOCUMENTS

| | | | | |
|---|---|---|---|---|
| 5,282,389 A | * | 2/1994 | Faivre et al. ............. | 73/861.73 |
| 5,529,537 A | * | 6/1996 | Johnson ........................ | 460/6 |
| 5,575,316 A | * | 11/1996 | Pollklas ...................... | 141/198 |
| 5,957,773 A | * | 9/1999 | Olmsted et al. ................. | 460/7 |
| 6,216,071 B1 | * | 4/2001 | Motz ........................... | 701/50 |
| 6,242,927 B1 | * | 6/2001 | Adams et al. ................. | 324/664 |
| 6,682,416 B2 | * | 1/2004 | Behnke et al. ............... | 460/114 |
| 2006/0240884 A1 | * | 10/2006 | Klimmer ..................... | 460/119 |
| 2009/0325658 A1 | * | 12/2009 | Phelan et al. .................. | 460/6 |

\* cited by examiner

*Primary Examiner*—Árpád Fábián-Kovács

(57) ABSTRACT

An apparatus for indicating a grain tank fill level for a grain tank (20) of an agricultural harvester (10), the harvester (10) having a chassis (12), an operator cabin (18) on the chassis (12); a threshing, separating, and cleaning means (24) on the chassis (12) for processing crop, a grain tank (20) on the chassis (18) for storing harvested grain and having an actual fill level of grain, a display (48) disposed in front of the operator in the direction of travel for displaying a fill level of the grain tank; a calculating means (46) coupled to the display (48) for calculating a fill level of the grain tank to be displayed on the display (48), and an operator input device (70) coupled to the calculating means (46) for selecting between first and second modes of operation, wherein the calculating means (46) is configured to repetitively and automatically calculate the fill level of the grain tank (20) in a first mode of operation and configured to repetitively and automatically indicate a scaled fill level that is scaled to a reference fill level different from the actual fill level in a second mode of operation, and further wherein the operator input device (70) is configured to indicate to the calculating means (46) the reference fill level when the operator input device (70) is selected by the operator.

15 Claims, 4 Drawing Sheets

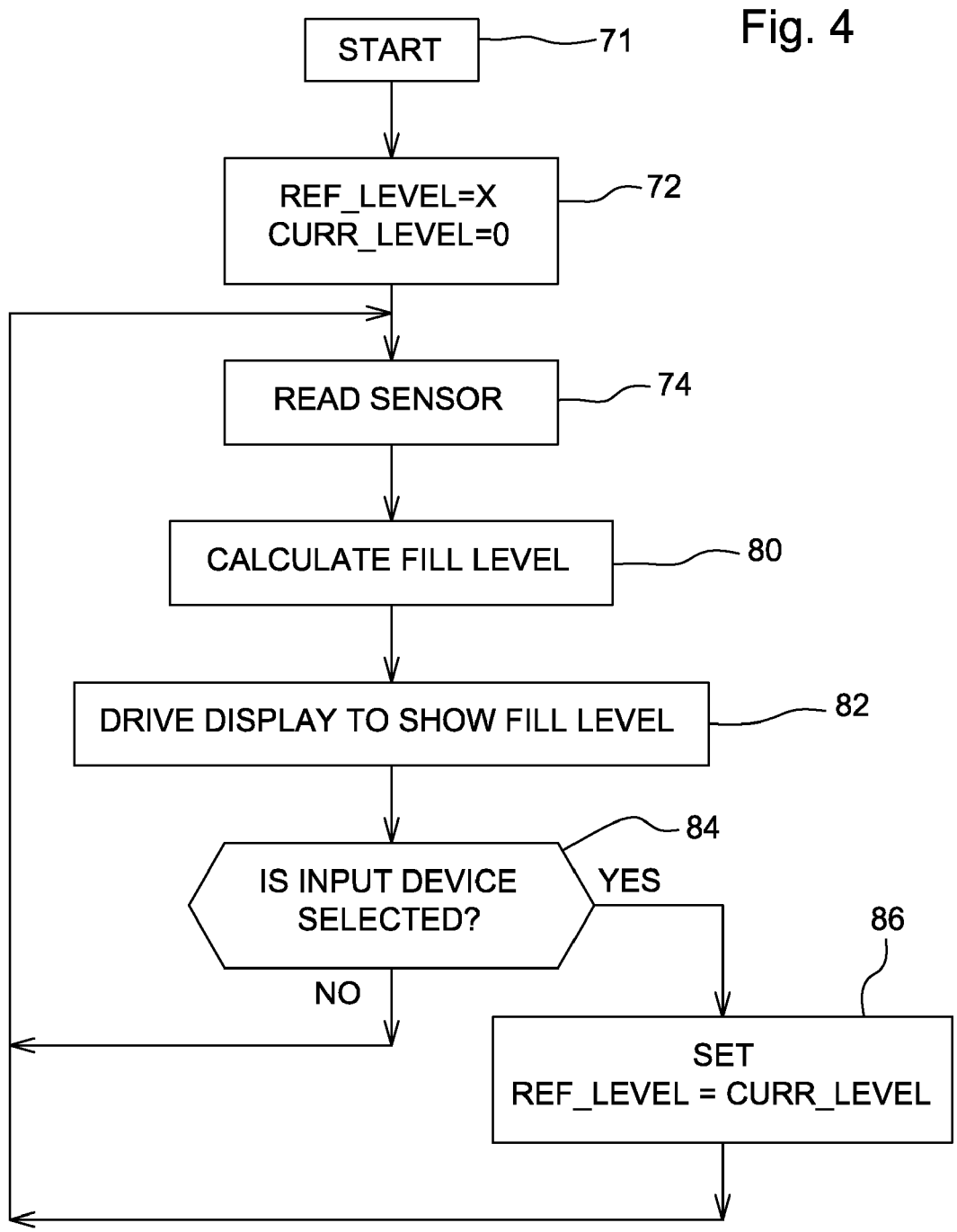

SCALABLE GRAIN TANK FILL LEVEL DISPLAY

FIELD OF THE INVENTION

The invention relates to agricultural equipment. More particularly, it relates to harvesting equipment. Even more particularly it relates to grain tank level indicators for agricultural harvesters.

BACKGROUND OF THE INVENTION

Agricultural harvesters are configured to receive cut crop from harvesting devices mounted at the front of the agricultural harvester, to thresh, separate, and clean that crop and to store that crop in a reservoir on the agricultural harvester commonly called a grain tank or grain bin. The grain tank or grain bin is typically an open topped structure disposed at the very top of the agricultural harvester.

When the grain tank is full, the operator must stop the agricultural harvester and wait until it can be unloaded. It is generally preferred not to stop the agricultural harvester for the unloading process, but to permit the harvester to cut and process crop continuously, unloading the harvester to a secondary vehicle, often called a grain cart (typically pulled by an agricultural tractor) or grain truck as the agricultural harvester moves through the field with the grain cart or truck alongside.

To ensure that unloading happens at the appropriate time, the operator of the harvester must regularly and periodically check the level of grain in the grain tank. For prior art agricultural harvesters, this requires that the operator stop watching the field he is harvesting, turn his head, crane his neck, and look through a small window at the top of the grain tank, to see whether the crop has reached an almost-full level. The operator will see nothing in the small window until the grain bin reaches perhaps 95% full.

This last-minute visualization means that the farmer may have to stop harvesting, send a radio communication and wait for the grain truck to arrive. This is a very inefficient use of the combine, since any time spent waiting and not harvesting is wasted time.

To give the operator a better estimate of the level of grain in the grain tank and to permit him to keep looking forward at the field he is harvesting, some manufacturers provided grain tank level sensors fixed to the wall of the grain tank. These sensors signal a circuit (when actuated) to indicate the corresponding fill level of the grain tank. The switches may be located to actuate at different fill levels, such as 75% and 100% of full. 100% of full meaning in this context that the grain tank is filled to its recommended carrying capacity.

In these arrangements, a visual or audible signal is provided to the operator in the operator cabin indicating the level of grain in the grain tank. Visual signals are presented in front of the operator so the operator can determine the level of grain without having to turn his head. Unfortunately, these arrangements indicate only a few levels to the operator, each level corresponding to a different level switch in the grain tank.

More recently, new arrangements have been invented that indicate the grain level in the grain tank with a higher resolution. For example, one design includes an ultrasonic sensor disposed above the grain tank that shines downward on the top of the grain. The ultrasonic sensor is capable of determining the height of grain in the grain tank to within a few cm. See, for example, U.S. patent application Ser. No. 11/402,782, which is assigned to Deere & Co. the assignee of the present application.

In another arrangement, the grain level in the grain tank is calculated by integrating an inlet grain flow rate of the grain coming into the grain tank and an outlet grain flow rate of the grain leaving the grain tank via an unloading conveyor. See, for example, U.S. patent application Ser. No. 12/164,926, which is assigned to Deere & Co., the assignee of the present application.

In both these applications, the operator is provided with the fill level of the grain tank. Since these arrangements have been developed, a new concern has arisen. The operator may not want the actual level in the tank indicated. Instead, the operator may wish to have the display indicate an arbitrary level or volume of grain in the grain tank different from the actual level or volume. For example, the operator may wish to contact the grain truck driver when the grain tank is 85% full to signal him to return for further unloading. Alternatively, the operator may want the display to indicate "full" when the grain tank is only 60% full in order to avoid getting stuck in soft ground. In both of these cases the operator has preference for displaying the grain tank as "full" at a level that he deems full under the conditions, which may be less than the absolute volumetric capacity of the grain tank.

To date, no system known to the inventors provides the operator with an easy way to change the scale values of the display in the operator cab. While the means described above permit the accurate measurement of the level of grain, they do not permit the operator to scale the display according to arbitrary grain tank fill levels that he deems most useful. It is an object of this invention to provide such a system.

SUMMARY OF THE INVENTION

BRIEF DESCRIPTION OF THE DRAWINGS

FIG. 4 is a flow chart of the operation of the fill level display.

DETAILED DESCRIPTION OF THE PREFERRED EMBODIMENT

Figure 1:
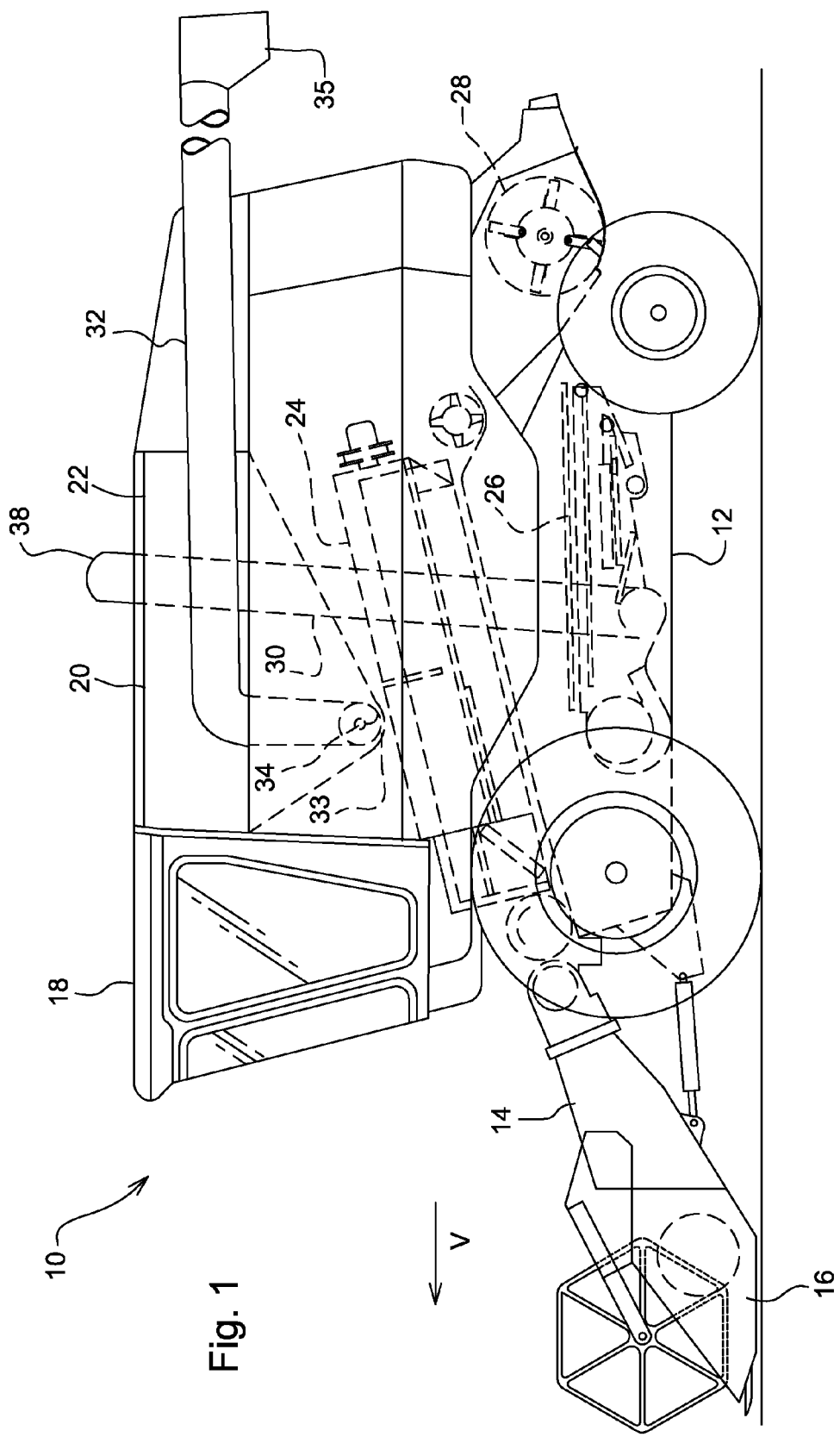
FIG. 1 is a side view of an agricultural combine in accordance with the present invention.

In reference to FIG. 1, a combine 10 is shown comprising a self-propelled vehicle 12 having a feederhouse 14 extending from the front of the vehicle, and a harvesting head 16 supported on the forward end of the feederhouse. The combine 10 travels in a direction "V" over the field to harvest crop.

Self-propelled vehicle 12 has an operator cabin 18 located above feederhouse 14. Behind operator cabin 18 is a grain tank 20 which has an open top 22. A rotor 24 for threshing cut crop material is disposed to receive cut crop material from feederhouse 14.

Grain threshed from the crop is conveyed to a cleaning and separating mechanism 26 disposed underneath threshing rotor 24. Unwanted plant material separated from the grain is conveyed rearward to a chopper 28, which chops the unwanted crop material and distributes it over the ground.

A grain elevator, here shown as an auger 30, is disposed underneath the cleaning and separating mechanism 26 to gather all the grain and carry it upward where it is deposited in the grain tank 20.

A first unloading conveyor 32, here shown as an auger, has an inlet 34 (adjacent outlet 33 of grain tank 20) disposed at the bottom of grain tank 20.

Grain exiting grain tank 20 enters inlet 34 under the force of gravity and is carried to an outlet 35 located at the other end of unloading conveyor 32, from which the grain is expelled and falls into the grain cart or grain truck immediately adjacent to combine 10.

Figure 2:
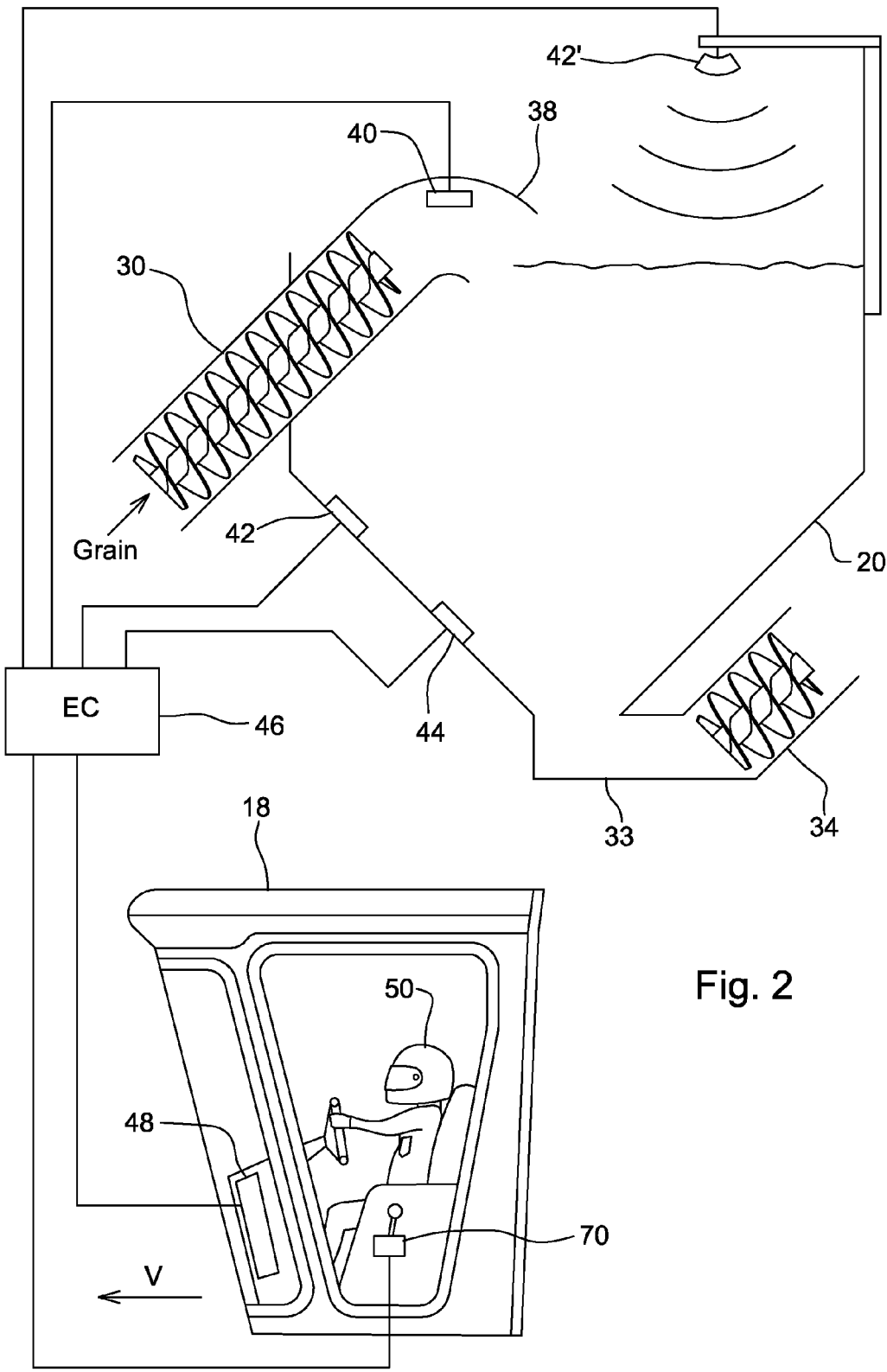
FIG. 2 is a schematic diagram of the fill level display.

In reference to FIG. 2, grain tank 20 receives grain through a grain tank inlet 38. A flow sensor 40 is disposed at grain tank inlet 38 to sense the passage of grain into the grain tank 20. Flow sensor 40 is coupled to electronic control unit 46 to provide a signal indicative of the rate of grain passing through grain tank inlet 38. Grain entering the inlet 38 of grain tank 20 impinges against flow sensor 40, which is preferably a mass flow sensor. The signal provided by flow sensor 40 is indicative of the mass flow rate flowing into grain tank 20.

A level sensor 42 is disposed to sense the level of grain inside grain tank 20 in a simple form this sensor may be a switch that is configured to be actuated when submerged by grain, thus indicating that grain has reached the level of the switch at the moment it is actuated.

Level sensor 42 may be a switch configured to transmit a signal indicating that the grain has reach the height of level sensor 42 inside grain tank 20.

An alternative level sensor 42' may be employed such as an ultrasonic sensor configured to sense the level of grain in the grain tank by reflecting ultrasonic signals off the surface of the grain in the grain tank. In this arrangement, level sensor 42' is capable of generating a signal indicating a plurality of grain levels in the grain tank 20.

Similarly, additional level sensors (for example level sensor 44) may be disposed to sense additional levels of grain in the tank different than the level provided by level sensor 42.

Level sensor 42 may be a switch configured to transmit a signal indicating that the grain has reach the height of level sensor 42 inside grain tank 20.

An electronic controller 46 is provided to which level sensors 42, 42', and 44 are coupled. These level sensors are configured provide signals to electronic controller 46 that are indicative of the level of grain in grain tank 20.

Electronic controller 46 preferably comprises a digital microprocessor with RAM and ROM, and further with driver circuits for reading the signals from sensors 40, 42, 42', 44, processing those signals. Electronic controller 46 is configured to provide an output signal to a display 48 disposed inside the operator cabin 18 in front of the operator 50, visible to the operator 50 when combine 10 is traveling in the forward direction of travel "V". The output signal provided to display 48 indicates the amount of grain in grain tank 20.

The grain tank has fixed contours, and thus there is a one-to-one relationship between the level of grain in the grain tank 20 and the volume, amount and weight of grain in the grain tank 20 for any particular grain that is harvested. Therefore, the level of grain in the tank provided by the sensors also provides the volume of the grain in the grain tank 20 according to a simple relationship that depends on the contours of any particular grain tank 20. The signals from sensors 42, 42', 44 indicate the level of grain in grain tank 20 and therefore also indicate the volume or weight of grain in grain tank 20 as well. More generally, they indicate the amount of grain in the grain tank. Similarly the signal from flow sensor 40 when integrated over time also indicates the volume or amount of grain in grain tank 20.

Electronic controller 46 is configured to determine the amount of grain in grain tank 20 in a variety of ways depending upon which sensors 40, 42, 42', 44 is employed. These are described in more detail herein in conjunction with FIG. 4.

During general harvesting operations electronic controller 46 is configured to determine the amount of grain in grain tank 20 as the agricultural harvester travels through he field harvesting crop, either by estimation and/or by the use of signals from one or more of sensors 40, 42, 42', 44 Electronic controller 46 configured to determine a an amount of grain in the grain tank. Electronic controller 46 is further configured to send an output signal indicating the amount of grain in the grain tank 20 to display 48, energizing the display elements of the display 48 to visually indicate the amount of grain.

Figure 3A:
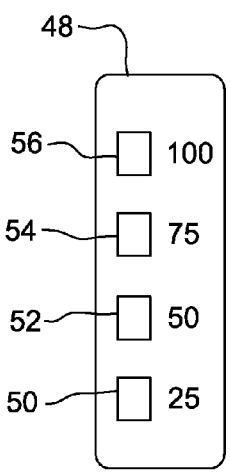
FIGS. 3A-3F are alternative display arrangements.

FIG. 3A-3F show several possible arrangements of display 48. In FIG. 3A, a simple arrangement of display elements is shown. These 4 elements, 50, 52, 54, 56 are arranged in a line, and are controlled by electronic controller 46 which sequentially energizes them starting with the element 50, the bottom element, to indicate that grain tank 20 is filled to the 25%, 50%, 75%, and 100% level.

Electronic controller 46 is configured to sequentially energize each of these display elements 50, 52, 54, 56 as the grain tank 20 reaches each of these successive levels.

Figure 3B:
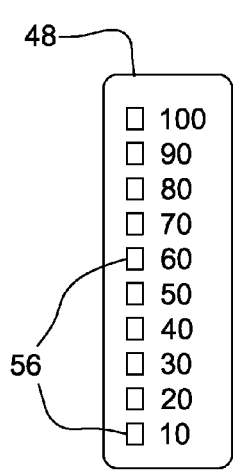

A similar arrangement is shown in FIG. 3B, in which there are 10 display elements 56, the illumination of each element indicating an additional 10% of grain tank being filled with grain. As in the previous example, electronic controller 46 is configured to successively illuminate these elements starting from the bottom as the level of grain in the grain tank 20 reaches each of these levels. In both of these arrangements, a legend is provided alongside each of the display elements to indicate the level of grain in grain tank 20.

Figure 3C:
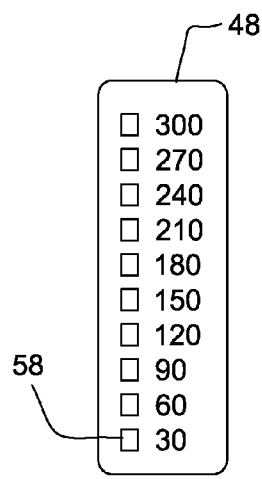

FIG. 3C shows another embodiment, in which the display does not indicate the percentage of fill, but rather the level of grain in the grain tank indicated in bushels. In this case, each display element 58 of display 48 indicates successive increases in the level of grain in grain tank 20 of 30 bushels.

Figure 3D:
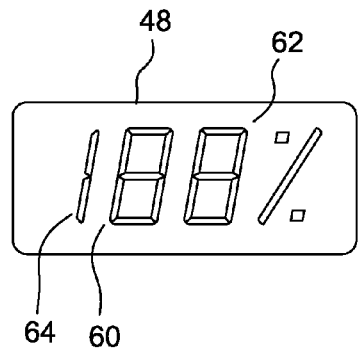

FIG. 3D shows another alternative display 48 having two display elements 60, 62, each of which being able to display a digit (preferably digits 0-9), and a third display element 64 configured to display the digit "1". In this embodiment, electronic controller 46 is configured to apply a signal to display 48 causing it to display the level of grain in the grain tank 20 measured in a percentage of the total capacity of the grain tank 20.

Figure 3E:
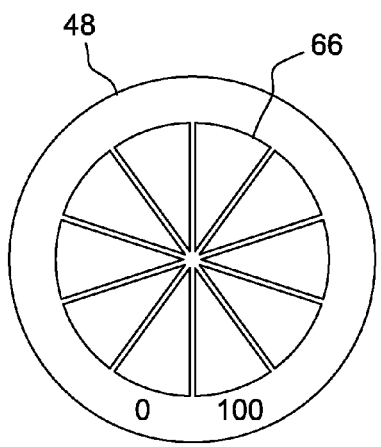

FIG. 3E shows an alternative display 48 in which a plurality of display elements 66 are disposed in a circular arrangement. In this arrangement, electronic controller 46 is configured to successively light each of the display elements 66 just as it successively lights each of the display elements of FIGS. 3A-3C.

Figure 3F:
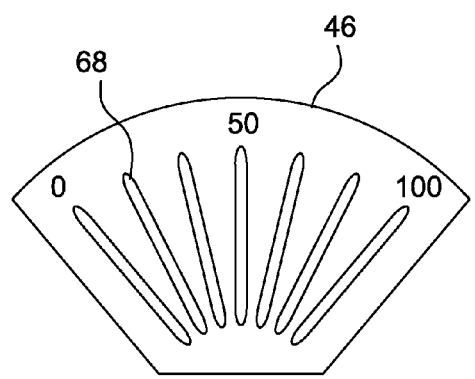

FIG. 3F shows another arrangement of display 48 arranged as a quadrant gauge and having a plurality of display elements 68 disposed in an arc. In this arrangement, electronic controller 46 is configured to selectively light the display elements 68 starting from the left side (identified by the number "0" and extending to the right side (identified by the number "100").

Referring back to FIG. 2, an operator input device 70 is coupled to electronic controller 46 and is configured to be manipulated by operator 50. When manipulated, operator input device 70 generates a signal which it provides to electronic controller 46. Electronic controller 46, upon receiving this signal, sets the maximum range of the display equal to the current level of grain in the grain tank 20. Once the maximum range of the display has been changed, electronic controller 46 scales its output signal that it applies to display 48 such that display 48 generates its "full" level (i.e. 100%, or 300 bushels in the examples shown in FIGS. 3A-3F) whenever it determines that the level of grain has risen to the same height during subsequent grain tank filling operations.

Electronic controller 46 executes the series of instructions shown in FIG. 4 to perform this task.

In FIG. 4, step 71 indicates the start of the process when the combine 10 is initially started up. In step 72, electronic controller 46 sets "REF_LEVEL", the reference level of grain in the grain tank equal to a default value of "X". In the preferred embodiment, REF_LEVEL initially holds a number that equals the level of the grain tank when electronic controller 46 shows the grain tank 100% filled. It is the predetermined level of grain in the grain tank.

Electronic controller 46 also sets a variable called "CURR_LEVEL" to zero. Buried this variable stores the running integrated value which indicates the actual level of grain in the grain tank that is continually calculated by electronic controller 46 by integrating the signal from flow sensor 40.

The grain tank is assumed to be initially empty, and hence the current level of grain in the grain tank (i.e. CURR_LEVEL) is zero. In an alternative arrangement, CURR_LEVEL, the level of grain in the grain tank, can be saved when the combine 10 is shut down. Thus, the combine could be shut with a partially filled grain tank 20 and a saved value of CURR_LEVEL that reflects this quantity of grain equal to this partially filled grain tank 20. For ease of explanation herein, we take the simplest example: the grain tank is initially empty, and CURR_LEVEL is therefore equal to zero.

In step 74, electronic controller 46 enters a polling loop which constitutes steps 74, 80, 82, and 84 (and optionally step 86) in which it repetitively reads sensor 40 and performs certain additional calculations described in detail below and.

In step 74 electronic controller 46 polls sensor 40. The value from sensor 40 is indicative of the instantaneous flow rate of grain into grain tank 20.

In the next step, step 80, a first arrangement of electronic controller 46 calculates the proportional fill level of grain tank 20. Electronic controller 46 adds the sensor 40 reading to the variable CURR_LEVEL, which is the running integrated value indicating the instantaneous amount of grain in the grain tank 20. In the preferred embodiment, electronic controller 46 calculates this fill level by dividing CURR_LEVEL by REF_LEVEL. This provides the grain level of grain tank 20 expressed as a decimal.

In an alternative step 80, a second arrangement of electronic controller 46 does not monitor sensor 40, but monitors sensor 42' and uses its reading as the CURR_LEVEL of grain in the tank, and subsequently dividing CURR_LEVEL by REF_LEVEL as described above. The signal provided by sensor 42' may be scaled to accommodate the different cross sectional areas of the tank. For example, a unit change in the height of the grain when the grain is at the bottom of the tank 20 indicates a much smaller change in grain quantity since the bottom of the tank has a small horizontal cross sectional area as compared to the top.

Putting the matter in more familiar terms, the volume of water necessary to change the height of water in a water glass by one centimeter is much smaller than the volume of water necessary to make a one centimeter change in the height of water in a swimming pool. After this calculation of the level of grain, the electronic controller 46 continues by dividing CURR_LEVEL by REF_LEVEL as described above.

In another alternative step 80, a third arrangement of electronic controller 46 calculates the level of grain in the tank by adding a predetermined volume of grain to CURR_LEVEL. This requires no input from the sensors and relies on the fact that the auger 30 deposits the same predetermined quantity of grain into the grain tank 20 over every interval of time that the auger 30 is operating. After this, electronic controller 46 divides CURR_LEVEL by REF_LEVEL as described above.

In another alternative step 80, a supplemental arrangement of electronic controller 46 is configured to monitor sensors 42, 44, or 42 and 44 to provide additional precision. Sensors 42, 44 are actuated when the grain reaches the level of the sensors 42, 44 in the grain tank 20. Electronic controller stores a grain tank 20 fill level associated with the actuation of each of the sensor 42, 44 called herein SENSOR_42_LEVEL and SENSOR_44_LEVEL. Electronic controller 46 supplementally monitors these sensors in step 80. electronic controller 46 determines whether sensors 42 or 44 have changed state since the last executed step 80. If so, electronic controller sets CURR_LEVEL equal to level of grain indicated by the sensor 42, 44 that just changed state (i.e. either it sets CURR-LEVEL to either SENSOR_42_LEVEL or SENSOR_44_LEVEL). This replaces the currently calculated CURR_LEVEL with a new CURR_LEVEL based upon the readings from sensor 42 and/or 44.

In step 82, electronic controller 46 transmits a signal to display 48 commanding it to display the proportionate level of fill of grain tank 20. Different displays have different types of driver circuits and require different methods of communicating this information. These different methods of driving display 48 are well-known in the art, and therefore are not described in detail. It is sufficient that whatever method is provided to energize the various display elements, that the energized elements indicate the proportion of grain in the grain tank. For example, and using the example described above, if CURR_LEVEL divided by REF_LEVEL equals 0.50, display 48 should display in some manner that grain tank 20 is 50% filled. Preferably, this can be done by energizing half (i.e. 50%) of the display elements. It can also be done by driving the display of FIG. 3D to say "50%". It can also be done by driving the display of FIG. 3C to indicate 150 bushels, which is 50% of the full range (300 bushels) of the display. Again, the manner in which the signals are sent may be complex, but the result should be as described. Intermediate proportions of fill would be similarly calculated and the display 48 driven in a similar manner to display those different proportions.

In step 84, electronic controller 46 polls operator input device 70 and determines whether the operator is selecting input device 70. If the operator has selected operator input device 70, electronic controller 46 branches in its execution path, following the "yes" route and executes step 86. if the operator has not selected operator input device 70, In step 86, electronic controller 46 sets REF_LEVEL equal to CURR_LEVEL for all future loops through polling loop 76.

The effect of manipulating the operator input device 70 is to set the current level of grain in the grain tank equal to 100%, and to scale all lesser quantities of grain in the grain tank (i.e. smaller numeric values of CURR_LEVEL) proportionately. From this point on, until the operator again presses operator input device 70, electronic controller 46 will drive display 48 to display not the actual percentage of fill of the grain tank or total bushels in the grain tank, but some lesser value, equal to the percent of grain in the grain tank proportionate to the actual fill level at the time the operator manipulated the operator input device.

For example, assume the operator selects operator input device 70 when the actual fill level is 50%. From then on, electronic controller 46 will scale the display 48 such that "0%" appears on the display 48 when the tank is empty (i.e. 0% full), and 100% appears on the display 48 when the grain tank 20 is 50% full.

This may be useful, for example, if the grain cart has a limited capacity, and can only receive 50% of the grain tank capacity at that time. If this was the case, the operator would want to know when he has one grain cart's worth of grain stored in the grain tank Having display 48 show "100%" when it is time for the grain cart to unload the combine would be a convenience to the operator.

The operator can follow the same process to reset electronic controller 46 to its original state. Assume that the scaling in the previous two paragraphs has already been performed, and therefore that display 48 indicates a completely full state (i.e. 100% or 300 bushels) when the grain tank 20 is less than completely full. To reset the system to its original state, the operator will simply fill the grain tank 20 beyond the level at which the now-scaled display 48 shows "100%" (which was configured to occur when the grain tank 20 was only 50% full in actuality), and continuing to fill grain-tank 20 until the grain tank is 100% full in actuality. At this point, the value of CURR_LEVEL will be twice as great as the value of REF_LEVEL.

At this point, the operator can Select operator input device 70. the resulting answer in step 84 of FIG. 4 will be "yes", and electronic controller 46 will reset REF_LEVEL to CURR_LEVEL, and display 48 will henceforth indicate "100%" when grain tank 20 is filled to an actual 100% of its capacity. According to the algorithm shown in FIG. 4, this has the additional effect of automatically scaling all of the intermediate values of grain tank 20 fill (i.e. 0%-99%) in a similar fashion.

Whenever the operator unloads the combine into the grain tank or grain truck accompanying the combine, he will reset CURR_LEVEL to 0 (using another device), and thereby always start filling an empty grain tank 20 with CURR_LEVEL set to zero. This resetting can occur in a variety of ways, for example by another operator input device.

In another arrangement, CURR_LEVEL can be determined by monitoring the signal from alternative sensor 42', which indicates the actual height of grain in the grain tank 20. Since the contours of the grain tank are fixed, the height of grain in the grain tank 20 at any time corresponds to a corresponding quantity of grain in the grain tank. Thus, electronic controller 46 can alternatively read the signal from sensor 42' in step 74, and in step 78 calculate CURR_LEVEL from that value by applying a mathematical operator to the value, the mathematical operator being a function of the contours of the particular grain tank.

In yet another alternative arrangement that employs one or both of sensors 42, 44, electronic controller 46 can increment CURR_LEVEL in proportion to the amount of time that auger 30 is operating and filling grain tank 20, thereby estimating the current level of grain in the tank as a function of the amount of time that auger 30 operates. This value can be corrected whenever the level of grain reaches the predetermined level of grain at which sensor 42 or sensor 44 are actuated. Since sensor 42 and sensor 44 are at predetermined physical heights within the grain tank, each corresponds to an absolute level of grain in grain tank 20.

The invention claimed is:

1. An apparatus for indicating a grain tank fill level for a grain tank (20) of an agricultural harvester (10), the harvester (10) having a chassis (12), an operator cabin (18) on the chassis (12); a threshing, separating, and cleaning means (24) on the chassis (12) for processing crop; a grain tank (20) on the chassis (18) for receiving grain from the threshing, separating and cleaning means (24) and for storing harvested grain and having a fill level; the apparatus comprising:
   a display (48) disposed generally in front of the operator when facing in the direction of travel for displaying the fill level of the grain tank;
   a calculating means (46) coupled to the display (48) for calculating the fill level of the grain tank to be displayed on the display (48); and
   an operator input device (70) coupled to the calculating means (46) for selecting at least one mode of operation of the calculating means (46) and display (48), wherein the calculating means (46) has a first mode of operation and a second mode of operation, and
   wherein the calculating means (46) in the first mode of operation is configured to repetitively and automatically calculate the fill level of the grain tank (20), and
   wherein the calculating means (46) in the second mode of operation is further configured to repetitively and automatically generate a scaled fill level in reference to a reference fill level selected by the operator, said scaled fill level being different from the fill level, and further
   wherein the operator input device (70) is configured to indicate the reference fill level to the calculating means (46) and is configured to select the second mode of operation.

2. The apparatus of claim 1, wherein the calculating means (46) comprises an electronic controller (46) and comprises at least one sensor means (40, 42, 42', 44) for indicating the amount of grain filling the grain tank (20).

3. The apparatus of claim 2, in which the electronic controller (46) is configured to scale the fill level by the reference fill level and further wherein the sensor means comprises one or more of a level sensor (42, 44), a flow sensor (40), or an ultrasonic sensor (42').

4. The apparatus of claim 2, wherein the scaled fill level displayed in the second mode of operation is greater than the fill level displayed in the first mode of operation.

5. The apparatus of claim 3, in which the electronic controller (46) automatically and sequentially provides updated scaled fill levels as the fill level of the grain tank (20) changes during the second mode of operation, and automatically and sequentially provides updated fill levels as the fill level of the grain tank (20) changes during the first mode of operation.

6. The apparatus of claim 1, wherein the calculation means (46) is configured to set a new reference fill level and automatically update the display (48) when the operator selects the operator input device.

7. The apparatus of claim 2 in which the operator can select the operator input device (70) from within the operator cabin (18) while the operator is driving the agricultural harvester (10) through an agricultural field and harvesting crop.

8. The apparatus of claim 2, in which a sensor means (40) indicates a flow rate of grain filling the grain tank (20).

9. The apparatus of claim 2, in which a sensor means (42) is fixed to a side wall of the grain tank (20).

10. The apparatus of claim 2, in which a sensor means (42') is disposed to ultrasonically sense the level of grain in grain tank (20).

11. The apparatus of claim 2, in which the electronic controller (46) is configured to automatically display the scaled fill level when the sensor means (42) is actuated in the second mode of operation, and to automatically display the fill level when the sensor means (42) is actuated in the first mode of operation.

12. A method for indicating a grain tank fill level for a grain tank (20) of an agricultural harvester (10) on a display (48), comprising the steps of reading a signal from a grain tank sensor (40, 42, 42', or 44) while the agricultural harvester (10) is harvesting an agricultural field, determining a fill level of grain in the grain tank (20) therefrom; monitoring an operator input device disposed in an operator cabin (18); and if said operator input device (70) is selected, establishing a reference grain level that is substantially the same as the instantaneous level of grain in the grain tank (20); scaling the fill level in accordance with the reference grain tank level; and displaying the scaled fill level on the display (48).

13. The method of claim 12, wherein the step of calculating a scaled fill level includes the step of setting the display (48) to display substantially 100% full immediately after the operator input device (70) is selected.

14. The method of claim 12 in which the step of reading a grain tank sensor includes the step of reading at least one of an input sensor (40), a level sensor (42, 44) disposed at the side of grain tank, or a level sensor (42') disposed to ultrasonically sense a level of grain in the grain tank (20).

15. The method of claim 12 wherein the scaled fill level is greater than the fill level.

* * * * *